Oct. 17, 1967 M. J. LUCKEY 3,347,636
BREATH TESTERS AND METHOD OF USE THEREOF
Filed Nov. 4, 1963
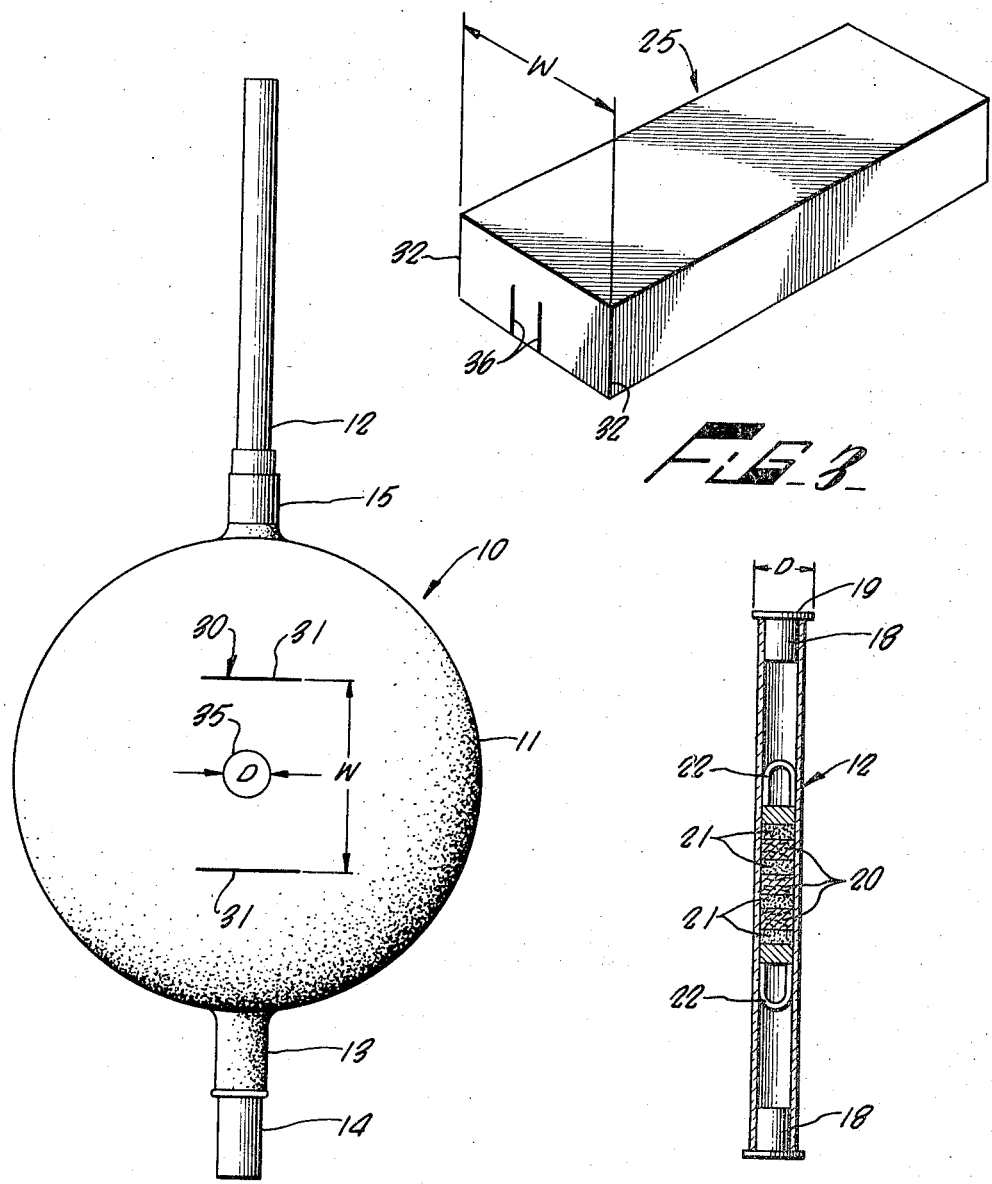
INVENTOR.
MANLEY J. LUCKEY
BY
Christie, Parker & Hale
ATTORNEYS.

United States Patent Office 3,347,636
Patented Oct. 17, 1967

3,347,636
BREATH TESTERS AND METHOD
OF USE THEREOF
Manley J. Luckey, San Bernardino, Calif., assignor to Luckey Laboratories, Inc., San Bernardino, Calif., a corporation of California
Filed Nov. 4, 1963, Ser. No. 321,012
6 Claims. (Cl. 23—232)

This invention relates to breath testers and, more particularly, to breath testers including an expansible balloon having means for assuring that the balloon is expanded to enclose a predetermined volume of breath, the balloon then exerting a predetermined pressure upon the breath contained therein.

It is known that there is a fixed relationship between the concentration of alcohol in the alveolar breath, which is lung breath, and the concentration of alcohol in the blood circulatory system. Many devices, therefore, are presently used by law enforcement agencies and others for the measurement of breath alcohol content. A majority of these devices rely upon an expansible rubber balloon for initially collecting a sample of breath to be tested for the presence of alcohol vapor. The amount of alcohol vapor in alveolar breath is a measure of the blood alcohol content, and therefore is a measure of the degree of intoxication of the subject from whom the breath sample is taken. In the usual breath testing device, the breath is passed from the balloon-type collection device through a container which holds chemical reagents responsive to the presence of alcohol vapor. A metered quantity of collected breath is caused to flow through the container so that the breath is brought into contact with the reagents. With presently existing breath testers, breath is caused to flow through the container for a fixed period of time, it being assumed that the balloon (often in conjunction with the construction of the tube) discharges breath at a uniform gas flow rate.

It has been found that unless the balloon exerts a reproducible pressure upon breath in it, the results of a breath alcohol test are inexact even though the breath may be caused to flow through the container for the correct period of time. Prior to this invention no simple and accurate means was available for determining when the balloon is expanded to exert the proper pressure upon the breath contained therein. The means for determining the proper expansion of the balloon must be simple because breath testing units often are used under adverse conditions. For example, police officers often must administer breath alcohol tests at night, in rainstorms, and the like, and when the person suspected of being intoxicated is unruly. The officer therefore cannot use a complicated balloon sizing procedure.

The invention provides simple and accurate means for rapidly determining when the balloon of a breath alcohol tester is properly inflated. Use of this method and apparatus assures that the results of a breath alcohol test are highly reproducible so they may be accepted as evidence of the extent of intoxication of persons tested.

Generally speaking, the tester includes an expansible balloon adapted to receive breath from a subject. It also includes a container adapted for connection to the balloon for conduction of breath from the balloon. Means are provided in the container which are adapted to react with at least one selected constituent of the breath flowing from the balloon. Indicia are imprinted upon the balloon to define a fixed dimension on the surface of the balloon when the balloon encloses a proper test volume. The fixed dimension is equal to a reference dimension defined by a reference member supplied with the tester. The reference member may be a component of the tester or a package for the balloon and container. The reference dimension is visually comparable with the dimension defined by the indicia to indicate when the volume enclosed by the balloon equals the test volume, thereby to indicate when breath contained in the balloon is held at a predetermined pressure.

The method and apparatus have particular utility with the breath alcohol tester disclosed in my copending application Serial Number 214,944, filed August 6, 1962, for Device for Alcohol Determination, now United States Patent 3,223,488. However, it will be apparent to those skilled in the art that the present invention has utility with any balloon-type breath collector.

The above-mentioned and other features of the present invention are more clearly set forth in the following detailed description and explanation of the invention taken in conjunction with the accompanying drawings, wherein:

FIG. 1 is an elevation view of a balloon-type breath tester;

FIG. 2 is a cross-sectional elevation view of an indicator tube of the device shown in FIG. 1; and FIG. 3 is a perspective view of a package for the device shown in FIG. 1.

Referring initially to FIG. 1, a breath tester 10 includes an expansible rubber balloon 11 and an indicator tube 12. The balloon defines a breath inlet duct 13 to which is connected a mouth piece 14. The balloon also defines an outlet fitting 15 which is airtightly connected with one end of the indicator tube. As shown in my copending application, the mouthpiece is equipped interiorly of the balloon with a check valve to prevent breath introduced into the balloon from escaping through the mouthpiece. The balloon is calibrated so that when the balloon encloses a predetermined quantity of gas therein, the gas is held at a predetermined pressure.

Indicator tube 12 is fabricated from a length of transparent hollow glass or plastic tubing. The tube is sealed at its opposite ends by a pair of substantially identical plug-like closure caps 18, each of which has an enlarged portion 19 of diameter greater than the outer diameter of the tube. The enlarged diameter portion 19 of each closure cap has a preselected diameter D.

Interiorly of the indicator tube is a quantity of chemical reagent which preferably, as shown in FIG. 2, is disposed in three separate layers 20. The reagent material is comprised of silica gel crystals which have been immersed in an acidic solution of sodium dichromate. The layers of reagent material are sandwiched between four untreated bodies 21 of silica gel crystals. The granular material in layers 20 and 21 is held in the interior of indicator tube 12 by a pair of retainer members 22.

The granular material is packed so that, in combination with the pressure exerted by balloon 11 on the breath in it, the granular material in the indicator tube defines means for providing a predetermined rate of breath flow through the tube. Accordingly, when the balloon has been properly inflated, it is only necessary to allow breath to flow through the tube for a fixed period of time to assure that a known quantity of breath flows through the tube. As a result, the indicator device provides an accurate and reproducible result which is reliable evidence of the degree of intoxication of the subject whose breath is tested.

The details of construction of indicator tube 12 and the nature of the reagent material contained in the tube are more fully set forth in the above-mentioned copending application.

Balloon 11 and one or more indicator tubes are in a package 25 shown in FIG. 3. The package is of predetermined dimensions and, for examlpe, has a width W of predetermined extent.

As noted above, in order to assure that tester 10 provides an accurate and reproducible measurement of breath alcohol content, it is necessary for a predetermined quantity of alveolar breath to be passed through indicator tube 12 for contact with reagent bodies 20. The reagent layers 20 and layers 21 of untreated silica gel crystals or the like are disposed in the indicator tube to present a fixed resistance to the flow of gas to assure a constant flowrate of breath through the tube when breath is introduced into the tube at a predetermined pressure. It is therefore necessary to assure that balloon 11 is inflated to an extent that the balloon exerts the required pressure upon breath contained therein. As a means of assuring that proper inflation of balloon 11 is attained, indicia 30 are imprinted on the exterior of balloon 11. As the balloon is expanded these indicia are visually observed to determine when the balloon is properly inflated. Indicia 30 are provided in the form of a pair of parallel lines 31 and the spacing between the lines defines a selected dimension on the balloon which has a predetermined value when the balloon is properly inflated. Lines 31 are spaced apart from each other a distance equal to width W of package 25 when the balloon is properly inflated. Accordingly, width W of the package constitutes a reference dimension for gaging inflation of the balloon.

Operation of tester 10 commences as the one administering the test (a police officer, for example) removes the deflated balloon and indicator tube from package 25. One of the closure caps 18 is removed from the tube and the opened end of the indicator tube is engaged in airtight relation with balloon fitting 15. The subject whose breath is to be tested then places mouthpiece 14 between his lips and commences inflation of the balloon. As the balloon is inflated, the officer places the end of package 25 against the balloon in the vicinity of lines 31. When lines 31 mate with edges 32 of the package so that the distance between the lines equals the reference dimension, the subject is instructed to cease inflation of the balloon. The balloon is then properly inflated and the subject's breath is contained in the balloon at a predetermined pressure because of the calibration of the balloon. The officer then removes the remaining closure cap from the end of the indicator tube spaced remote from balloon 11 and allows breath to flow through the tube along a predetermined path defined interiorly of the tube for a predetermined period of time, usually one minute. Since the tube itself is constructed to define a predetermined resistance to flow of gas therethrough, a precisely regulated quantity of alveolar breath is caused to come into contact with the reagents in the tube.

Alternatively, the balloon is completely exhausted through the indicator tube by squeezing the balloon to a collapsed condition. Since the balloon was filled to a calibrated mark, a known volume of gas is forced through the tube. This latter procedure has the advantage of eliminating the timing of the flow of gas through the indicator tube.

As more clearly set forth in my copending application, the reagent material contained in indicator tube has the characteristic that it changes color progressively longitudinally of the tube in proportion to the amount of ethanol passed through the tube during the predetermined period of time. Since the tube is transparent, the administering officer need only examine the extent of the progressive color change of the reagent material to obtain an accurate measure of the degree of intoxication of the subject. If all the reagent material in the first layer 20 adjacent balloon 11 changes color, this means that the sobriety of the subject is at least questionable. If any portion of the middle reagent layer changes color, the officer knows that the subject may be presumed to be intoxicated within applicable legal standards.

Since one of the closure caps 18 must be removed from indicator tube prior to connection of the tube to the balloon, this closure cap may be used as a second reference body for measuring the proper inflation of the balloon in combination with indicia imprinted upon the balloon. Accordingly, second indicia 35 in the form of a circle are imprinted upon the balloon, preferably between lines 31. When the balloon is inflated to the proper volume, circle 35 is enlarged so that its diameter corresponds to the diameter of enlarged portion 19 of a closure cap. Accordingly, as the balloon is inflated the administering officer need only hold the cap against the balloon over indicia 35 to gage the size of the balloon. When the cap fits comfortably within the circle defined by indicia 35, the subject is instructed to cease inflation of the balloon.

In many cases the officer administering the breath test prefers not to use a closure cap as a gaging unit because of its small size, but a double check on balloon inflation is desired. Accordingly, a pair of marks 36 are imprinted on package 25. The marks are spaced apart a distance equal to the diameter of circle 35 when the balloon is properly inflated. It is preferred that the marks be located on the package between edges 32 so that the edges mate with lines 31 when marks 36 mate with circle 35.

It will be apparent to those skilled in the art that marks 36 may be used with indicia other than a circle and that distance W may be defined by the package without reference to package edges 32.

Prior to the development of this invention, traffic officers and others administering breath tests with devices using inflatable balloons had only approximate means for determining whether the balloon was properly inflated. By providing indicia upon the balloon which change dimension with the balloon and which are referable to a predetermined standard supplied with the tester, the inventive apparatus provides extremely simple yet very effective means for obtaining proper inflation of the balloon.

While the invention has been described above in conjunction with specific apparatus, this has been by way of example only. It is to be understood that the invention may be used in any apparatus wherein an expansible balloon must be inflated to a predetermined volume. For example, the invention described above may be used to advantage in apparatus such as that disclosed in United States Patent 2,591,691, issued April 8, 1952 to G. C. Forrester for Method for Determining Breath Alcohol Content, or it may be used in conjunction with the apparatus disclosed in United States Patent 3,009,786, issued to Manley J. Luckey on November 21, 1961 for Apparatus for Determining Alcohol Content of Gases.

What is claimed is:

1. In a breath tester for indirect measurement of blood alcohol content including an expansible balloon arranged for inflation by a person whose breath is to be tested, the balloon exerting thereon a predetermined pressure upon breath contained therein when inflated to a certain size, a container adapted for connection to the balloon and for conduction therethrough of breath from the balloon, means in the container adapted to react with at least one selected constituent of breath passed through the container, and means effectively associated with the container for regulating the flow through the container of breath applied thereto at said predetermined pressure to a selected flowrate, the improvement comprising indicia imprinted upon the balloon defining a predetermined dimension on the surface of the balloon when the balloon is inflated to said certain size, and a reference member defining a reference dimension equal to said predetermined dimension, the reference dimension being visually comparable to the dimension defined by the indicia to accurately indicate when the balloon is inflated to said certain size and exerts upon breath contained therein said predetermined pressure.

2. Apparatus according to claim 1 including a closure member for the container, said closure member being removed from the container during use of the apparatus, the closure member constituting said reference member.

3. Apparatus according to claim 1 including a package for the breath tester, the package constituting said reference member.

4. Apparatus according to claim 1 wherein the container is transparent and the means in the container is adapted to react chemically with a selected product of biologic oxidation of alcohol to produce a change of color thereof.

5. Apparatus according to claim 4 including granular carrier means packed in the container as a supporting medium for the chemically reacting means, the chemically reacting means changing color progressively along the container in response to reaction with said selected oxidation product, the extent of color change progression within a selected time of breath flow through the container at said selected flowrate indicating the amount of alcohol present in the blood of the person from whom the breath was obtained.

6. The method of inflating an expansible balloon of a breath alcohol tester to a predetermined size so that the balloon exerts a predetermined pressure upon breath contained therein, said breath in use of the tester being passed from the balloon through a device which passes breath at a predetermined rate at the predetermined pressure, the method comprising the steps of (a) imprinting upon the balloon indicia which define a selected linear dimension across the balloon surface when the balloon is inflated to said predetermined size, (b) providing for the tester a container which defines a reference dimension equal to the selected dimension, (c) inflating the balloon, (d) comparing the reference dimension to the dimension defined by the indicia by juxtaposing the container with the balloon at the indicia, and (e) further inflating the balloon and comparing the reference and indicia dimensions until the indicia dimension equals the reference dimension.

References Cited

UNITED STATES PATENTS

| 3,009,786 | 11/1961 | Luckey | 23—254 |
| 3,223,488 | 12/1965 | Luckey | 23—254 |

OTHER REFERENCES

Harger, R. N. Lamb, E. B., Hulpieu, H. R., Jour. A.M.A. 110, No. 11, 779–785, March 12, 1938, p. 782 relied on.

MORRIS O. WOLK, *Primary Examiner.*

R. M. REESE, *Assistant Examiner.*